United States Patent [19] [11] 4,133,350
Nelson [45] Jan. 9, 1979

[54] TAMPER-RESISTANT FLOW CONTROL ATTACHMENT FOR SHOWER ARM

[76] Inventor: Walter R. Nelson, 7914 Grand Ave., Yucca Valley, Calif. 92284

[21] Appl. No.: 775,102

[22] Filed: Mar. 7, 1977

[51] Int. Cl.[2] ........ F16L 15/00

[52] U.S. Cl. ........ 138/44; 285/90

[58] Field of Search ........ 138/44, 43, 42, 45; 285/45, 80, 90

[56] References Cited

U.S. PATENT DOCUMENTS

| | | | |
|---|---|---|---|
| 904,673 | 11/1908 | Bideker | 285/90 |
| 1,284,159 | 11/1918 | Sickman | 285/90 |
| 3,817,560 | 6/1974 | Guertin | 285/90 |
| 3,995,664 | 12/1976 | Nelson | 138/43 |

*Primary Examiner*—Richard E. Aegerter
*Assistant Examiner*—L. Footland
*Attorney, Agent, or Firm*—Fraser and Bogucki

[57] ABSTRACT

A tamper-resistant flow control attachment for shower installations is disclosed including a tubular housing adapted to be disposed between a shower arm and shower head. A first set screw locks the attachment to the shower arm. A tubular shell enclosing at least a portion of the housing and freely rotatable relative thereto conceals the first set screw. The shell includes a second set screw projecting into an annular groove in the housing for limiting axial movement of the shell. The set screws require a special installation/removal tool.

2 Claims, 2 Drawing Figures

TAMPER-RESISTANT FLOW CONTROL ATTACHMENT FOR SHOWER ARM

FIELD AND BACKGROUND OF THE INVENTION

1. Field of the Invention

This invention relates generally to flow control attachments that are resistant to tampering.

2. Background of the Invention

As the use of commercial establishments of volumetric flow limiting devices in plumbing systems becomes more prevalent, the incidence of theft and other tampering with such devices has significantly increased. Because the cost of replacing stolen or damaged flow limiters may be substantial in establishments where large numbers of these devices are employed, techniques have been sought to eliminate or at least discourage such tampering.

SUMMARY OF THE INVENTION

The present invention provides a tamper-resistant attachment adapted for installation between a shower arm and shower head. The attachment comprises a generally tubular housing having a longitudinal axis, an outer, generally cylindrical surface, an inlet portion adapted to be coupled to a shower arm and an outlet portion adapted to be coupled to a shower head. A flow control device for limiting the volumetric flow rate through the attachment is enclosed within the housing. The housing is secured against rotation relative to the shower arm by means of a set screw. The outer surface of the housing is provided with an annular groove. An outer, generally tubular shell is disposed about the housing and covers both the set screw securing the housing to the shower arm and the annular groove. The shell also includes means, preferably a set screw of the Allen head type, which projects into the annular groove for limiting the axial movement of the shell relative to the housing. The shell, however, is freely rotatable relative to the housing so that any attempt to remove the attachment in the absence of a special wrench will be discouraged. Any attempt to unthread the attachment from the shower arm results only in rotation of the outer shell relative to the housing.

BRIEF DESCRIPTION OF THE DRAWINGS

Further objects, advantages and features of the invention will become apparent from a reading of the detailed description below when taken in conjunction with the accompanying drawings, in which.

DETAILED DESCRIPTION OF THE PREFERRED EMBODIMENT

Figure 1:
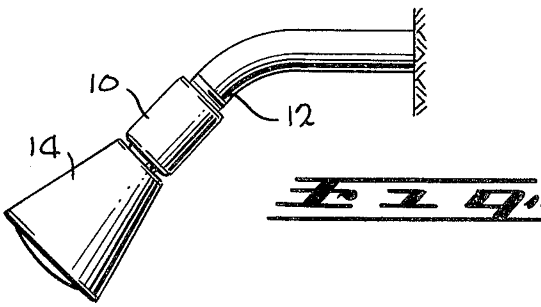
FIG. 1 is a side elevation view of a typical shower installation employing the tamper-resistant flow control attachment of the present invention.

As shown in FIG. 1 a typical shower installation employing the present invention includes a tamper-resistant flow control attachment 10 threadedly secured to a shower arm 12 and a shower head 14 is in turn connected to the attachment.

Figure 2:
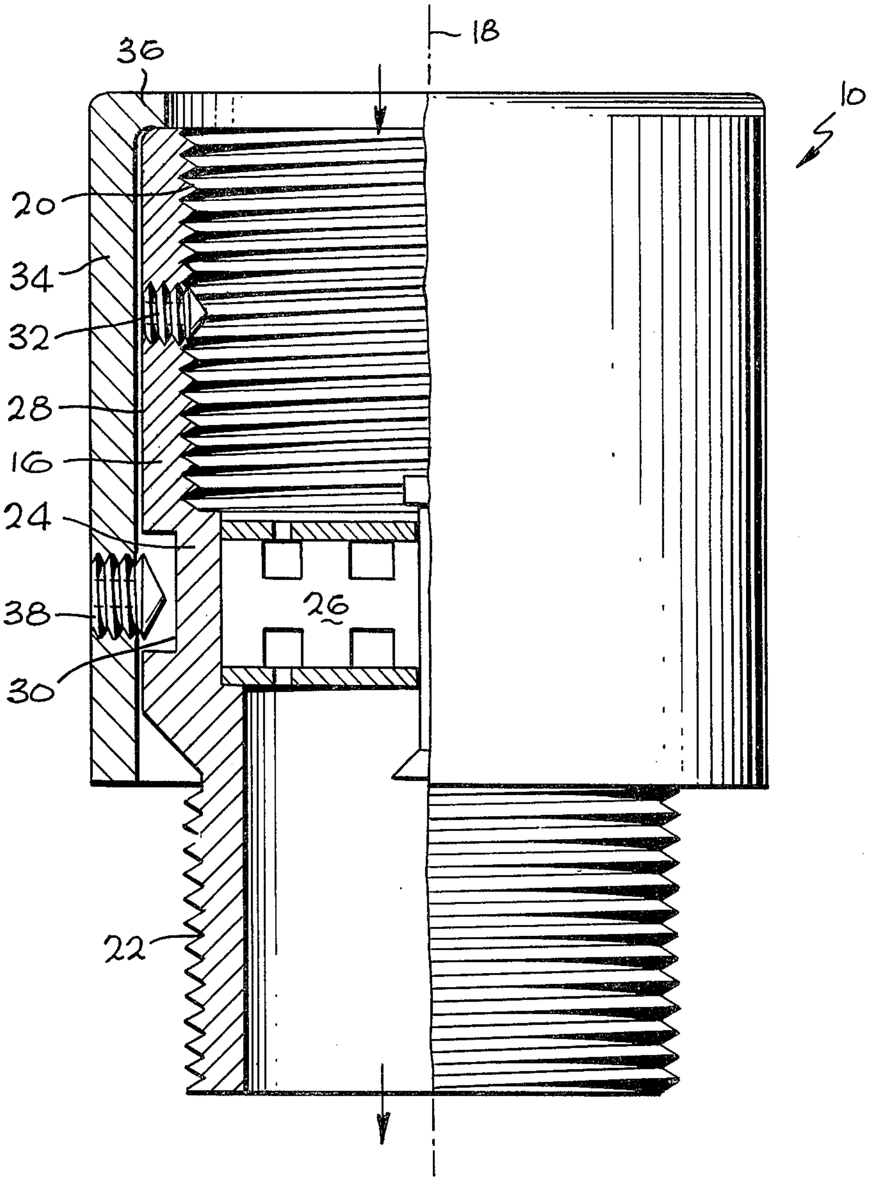
FIG. 2 is a side elevation view, partly in cross-section, of a tamper-resistant flow control attachment according to the present invention.

With reference to FIG. 2, the attachment 10 includes a generally tubular housing 16 having a longitudinal central axis 18. The housing 16 further has an internally threaded inlet portion 20 adapted to be received by the shower arm and a necked down, externally threaded outlet portion 22 for receiving the shower head.

Between the inlet and outlet portions, the housing 16 defines a central portion 24 enclosing a volumetric flow control device 26 of the type disclosed for example in U.S. Pat. No. 3,995,664, issued Dec. 7, 1976, to the present inventor. The control device 26 functions to limit the water flow rate to a predetermined level, for example, 3 gpm, thereby conserving water and concomitantly the energy required to heat it.

The housing 16 also includes a generally cylindrical outer surface 28 having an annular groove 30 therein positioned in the central portion of the housing.

The inlet portion 20 has a radially oriented set screw 32 adapted to engage the threads of the shower arm thereby locking the housing against rotation once installed. The set screw 32 is of the type requiring a special wrench and may, for example, be of the Allen head type.

Enclosing the inlet and central portions of the housing 16 is an outer tubular shell 34 covering and thereby concealing both the set screw 32 and the annular groove 30. The upper or inlet end of the shell 34 may be provided with an inturned rim 36 for engaging the inlet end of the housing 16. A set screw 38 of the same type as the screw 32 is retained in the wall of the shell 34 and projects into the annular groove 30. It will be readily apparent that the outer shell is freely rotatable relative to the housing 16 but is constrained axially by the set screw 38 and groove 30.

The attachment is installed by threadedly fastening the housing to the shower arm, driving the set screw 32 into a locking engagement with the shower arm threads, sliding the tubular shell over the housing and finally turning the set screw 38 to project into the groove 30. The free rotatability of the outer shell and the concealment of the inner set screw 32 thereby effectively discourage attempts to remove the attachment in the absence of the special tool.

What is claimed is:

1. A tamper-resistant flow control attachment for a shower arm comprising:

a generally tubular housing including a longitudinal, central axis, an outer, generally cylindrical surface, an inlet end, an internally threaded inlet portion adapted to be secured to the discharge end of a shower arm, and an outlet portion having external threads adapted to be secured to the inlet of a shower head, a central portion between the inlet and outlet portions carrying means for controlling the volumetric flow rate through the attachment, an annular groove in the outer surface disposed between the inlet and outlet portions and a first radially oriented set screw requiring a special wrench for installation and removal for securing the housing to the shower arm against rotation relative thereto; and an outer tubular shell, concentric with and enclosing the inlet and central portions of the housing, one end of the shell extending beyond the annular groove so as to completely cover the groove and including a second radially oriented set screw requiring a special removal installation tool and extending into the groove to limit axial movement of the shell, the shell being freely rotatable relative to the housing.

2. An attachment, as defined in claim 1, in which the other end of the shell includes an inturned rim for engaging the inlet end of the housing.

* * * * *